United States Patent [19]
Funyu

[11] Patent Number: 6,058,468
[45] Date of Patent: May 2, 2000

[54] CENTRAL PROCESSING UNIT AND MICROCOMPUTER HAVING TESTING OF CIRCUITRY EXTERNAL TO THE CENTRAL PROCESSING UNIT

[75] Inventor: Masami Funyu, Yokohama, Japan

[73] Assignee: Kabushiki Kaisha Toshiba, Kawasaki, Japan

[21] Appl. No.: 09/110,883

[22] Filed: Jul. 7, 1998

[30] Foreign Application Priority Data

Sep. 6, 1994 [JP] Japan .................................. 6-212993

[51] Int. Cl.[7] .................................................. G06F 15/00
[52] U.S. Cl. .................................. 712/39; 714/30; 712/38
[58] Field of Search ................................ 712/33, 36, 38, 712/39, 42; 714/30, 31, 25, 27

[56] References Cited

U.S. PATENT DOCUMENTS

| | | | |
|---|---|---|---|
| 4,084,233 | 4/1978 | Handly et al. | 712/37 |
| 4,475,195 | 10/1984 | Carey | 714/43 |
| 4,504,903 | 3/1985 | Dickman | 710/260 |
| 4,967,387 | 10/1990 | Shibasaki et al. | 702/120 |
| 4,989,208 | 1/1991 | Akao et al. | 714/31 |
| 5,089,951 | 2/1992 | Iijima | 710/36 |
| 5,193,195 | 3/1993 | Miyazaki | 710/262 |
| 5,228,139 | 7/1993 | Miwa et al. | 714/27 |
| 5,253,255 | 10/1993 | Carbine | 714/734 |
| 5,280,618 | 1/1994 | Takagi | 710/260 |
| 5,416,919 | 5/1995 | Ogino et al. | 714/30 |
| 5,448,744 | 9/1995 | Eifert et al. | 712/40 |
| 5,483,638 | 1/1996 | Katsuta | 714/30 |
| 5,500,830 | 3/1996 | Okabayashi | 365/230.08 |
| 5,509,019 | 4/1996 | Yamamura | 714/718 |
| 5,525,971 | 6/1996 | Flynn | 340/825.06 |
| 5,530,806 | 6/1996 | Condon et al. | 714/49 |
| 5,544,311 | 8/1996 | Harenberg et al. | 714/40 |
| 5,581,698 | 12/1996 | Miwa et al. | 714/42 |

Primary Examiner—Larry D. Donaghue
Attorney, Agent, or Firm—Oblon, Spivak, McClelland, Maier & Neustadt, P.C.

[57] ABSTRACT

A microcomputer has a first external terminal for receiving an external control signal that indicates a test mode of peripheral circuits, and a second external terminal connected to a data bus. A CPU of the microcomputer provides a bus control signal in response to the external control signal passed through the first external terminal, to write data passed through the second external terminal into the peripheral circuits. Upon receiving the external control signal, a bus controller of the CPU stops a bus cycle requested by an execution controller of the CPU and starts a bus cycle requested by the external control signal, to test the peripheral circuits.

12 Claims, 10 Drawing Sheets

CENTRAL PROCESSING UNIT AND MICROCOMPUTER HAVING TESTING OF CIRCUITRY EXTERNAL TO THE CENTRAL PROCESSING UNIT

BACKGROUND OF THE INVENTION

1. Field of the Invention

The present invention relates to a central processing unit (CPU) and to a microcomputer incorporating the CPU, peripheral circuits, and a function of testing the peripheral circuits.

2. Description of the Prior Art

Microcomputers are used in various fields. To satisfy a variety of user requirements, many kinds of microcomputers must be developed.

One of the methods to provide a microcomputer that meets user requirements is a megacell method. This method stores layouts of function blocks such as CPUs, memories, timers, and serial interfaces in a computer database. Necessary function blocks are picked up from the database and arranged to form the connection diagram and mask data of a microcomputer. In addition to the function blocks, logic gate arrays are arranged in the microcomputer according to user requirements.

This method is capable of developing a customized microcomputer in a short time. The customized microcomputer must be efficiently and correctly simulated and tested.

To test peripheral function blocks in the customized microcomputer, a test program having machine-language instructions is executed by a CPU of the microcomputer.

FIG. 1 shows a method of testing peripheral function blocks of a customized microcomputer according to a prior art.

The microcomputer 101 has a CPU 102 and peripheral function blocks. The function blocks include peripheral function macros 103 and 104 and a memory macro 105. These elements are connected to one another through an address bus 106, a data bus 107, and a control signal group 108.

The CPU 102 works in synchronization with a clock signal provided to a clock terminal 109. The microcomputer 101 is reset by a reset signal provided to a reset terminal 112. The function macros 103 and 104 have external terminals 110 and 111, respectively, serving as interfaces with respect to external devices.

The CPU 102 executes instructions stored in the memory macro 105, to test the write and read operations of the function macros 103 and 104 through the data bus 107.

Namely, the CPU 102 runs a test program having machine-language instructions proper for the CPU. The CPUs frequently employ different machine-language instructions, and therefore, different test programs must be prepared for CPUs of different kinds.

For a CPU involving simple operations, test vectors are manually prepared. For a CPU involving complicated operations, test vectors are prepared through simulations with an operation model of the CPU. It is difficult to form a correct operation model of a CPU involving complicated operations and large-scale circuits.

Simulating the operation of a large-scale CPU with a model takes a long time to deteriorate testing efficiency.

The user of a customized microcomputer must simulate the operation thereof by himself. In this case, the manufacturer of the microcomputer must provide the user with information about the internal structure of the CPU that must be concealed from the user.

Japanese Laid-Open Patent No. 2-289999 discloses a method of testing an internal memory of a microcomputer. This disclosure employs a unit for connecting some of the external terminals of peripheral function macros to internal data and address buses, to write and read data to and from the internal memory.

This technique provides the internal memory with control signals through the external terminals during a test. This technique tests only the internal memory and is incapable of testing a connection between a CPU and the memory.

Accordingly, to test the connection between the CPU and the memory, it is necessary to employ a function of the CPU, to thereby raise the problem of preparing an operation model of the CPU as mentioned above.

SUMMARY OF THE INVENTION

To solve these problems of the prior art, an object of the present invention is to provide a CPU that employs only a bus controller thereof when testing peripheral function blocks.

Another object of the present invention is to provide a microcomputer having a CPU and peripheral function blocks such as peripheral circuits and memories, capable of testing the function blocks only with a bus controller of the CPU without an instruction executing function of the CPU.

Still another object of the present invention is to provide a microcomputer that is simulated only with a partial model of a CPU of the microcomputer, so that test vectors may easily be prepared with a simulator.

In order to accomplish the objects, the present invention provides a CPU having an execution controller for controlling the execution of instructions; a bus controller connected to external circuits through an address bus and a data bus, for generating a bus control signal to inform the external circuits of the execution of a bus cycle; and an operation unit connected to the execution controller and bus controller, for processing data. The bus cycle may be an instruction fetching bus cycle for fetching an instruction from the external circuits, an operand fetching bus cycle for fetching an operand from the external circuits, or an operand storing bus cycle for writing a result of operation into the external circuits. The bus cycle is carried out in response to a bus cycle execution request from the execution controller.

The bus controller stops the bus cycle requested by the execution controller upon receiving an external control signal that requests a bus cycle, and starts the bus cycle requested by the external control signal.

Accordingly, a microcomputer employing this CPU may test peripheral circuits only with the bus controller of the CPU.

The CPU may have an I/O circuit connected to the bus controller and execution controller.

The I/O circuit electrically disconnects the execution controller of the CPU from the address and data buses while the bus cycle requested by the external control signal is being executed.

Namely, an address output from the CPU to the address bus and a data output from the CPU to the data bus are surely disabled only by controlling the bus controller during a test of the peripheral circuits.

The present invention also provides a microcomputer having the CPU mentioned above, peripheral circuits connected to the CPU through a data bus; a first external terminal for receiving an external control signal that specifies a test mode of the peripheral circuits; and a second external terminal connected to the data bus.

The bus controller of the CPU provides a bus control signal in response to the external control signal passed through the first external terminal, to write data supplied through the second external terminal into the peripheral circuits.

This arrangement is capable of carrying out a write test of the peripheral circuits without the execution controller and operation circuit of the CPU.

The present invention also provides a microcomputer having the CPU mentioned above; peripheral circuits connected to the CPU through a data bus; a first external terminal for receiving an external control signal that specifies a test mode of the peripheral circuits; and a second external terminal connected to the data bus.

The bus controller of the CPU provides a bus control signal in response to the external control signal passed through the first external terminal, to read data out of the peripheral circuits and send the read data outside through the second external terminal.

This arrangement is capable of carrying out a read test of the peripheral circuits without the execution controller and operation circuit of the CPU.

The present invention also provides a microcomputer having the CPU mentioned above; peripheral circuits connected to the CPU through a data bus; a first external terminal for receiving an external control signal that specifies a test mode of the peripheral circuits; a second external terminal for receiving an external control signal defining whether the test mode is a write test or a read test; and a third external terminal connected to the data bus.

If the external control signal passed through the second external terminal indicates a write test, the bus controller of the CPU provides a bus control signal in response to the external control signal passed through the first external terminal, to write data supplied through the third external terminal and data bus into the peripheral circuits.

If the external control signal passed through the second external terminal indicates a read test, the bus controller of the CPU provides a bus control signal in response to the external control signal passed through the first external terminal, to read data out of the peripheral circuits and send the read data outside through the third external terminal.

The present invention also provides a microcomputer having the CPU mentioned above; peripheral circuits connected to the CPU through a data bus; an external terminal for receiving an external control signal that specifies a test mode of the peripheral circuits; and a data generator for generating test data for the peripheral circuits.

The data generator generates data and the bus controller of the CPU provides a bus control signal to write the generated data into the peripheral circuits, in response to the external control signal passed through the external terminal.

This arrangement is capable of carrying out a write test of the peripheral circuits without the execution controller and operation circuit of the CPU and without externally supplying write data.

The present invention also provides a microcomputer having the CPU mentioned above; peripheral circuits connected to the CPU through a data bus; an external terminal for receiving an external control signal that specifies a test mode of the peripheral circuits; and a data compressor for compressing data on the data bus.

The bus controller of the CPU provides a bus control signal to read data out of the peripheral circuits and the data compressor compresses the read data, in response to the external control signal passed through the external terminal.

The present invention also provides a microcomputer having the CPU mentioned above; peripheral circuits connected to the CPU through a data bus; a first external terminal for receiving an external signal that specifies a test mode of the peripheral circuits; a second external terminal for receiving an external signal to specify whether the test mode is a write test or a read test; a data generator for generating data used to test the peripheral circuits; and a data compressor for compressing data on the data bus.

If the external control signal passed through the second external terminal indicates a write test, the data generator provides data to the data bus and the bus controller of the CPU provides a bus control signal to write the data on the data bus into the peripheral circuits, in response to the external control signal passed through the first external terminal.

If the external control signal passed through the second external terminal indicates a read test, the bus controller of the CPU provides a bus control signal to read data out of the peripheral circuits and the data compressor compresses the read data, in response to the external control signal passed through the first external terminal.

This arrangement is capable of carrying out a read test of the peripheral circuits without the execution controller and operation circuit of the CPU and without supplying the read data outside.

BRIEF DESCRIPTION OF THE DRAWINGS

Other objects and advantages of the present invention will be apparent from the following description taken in connection with the accompanying drawings, wherein.

DETAILED DESCRIPTION OF THE EMBODIMENTS

Figure 2:
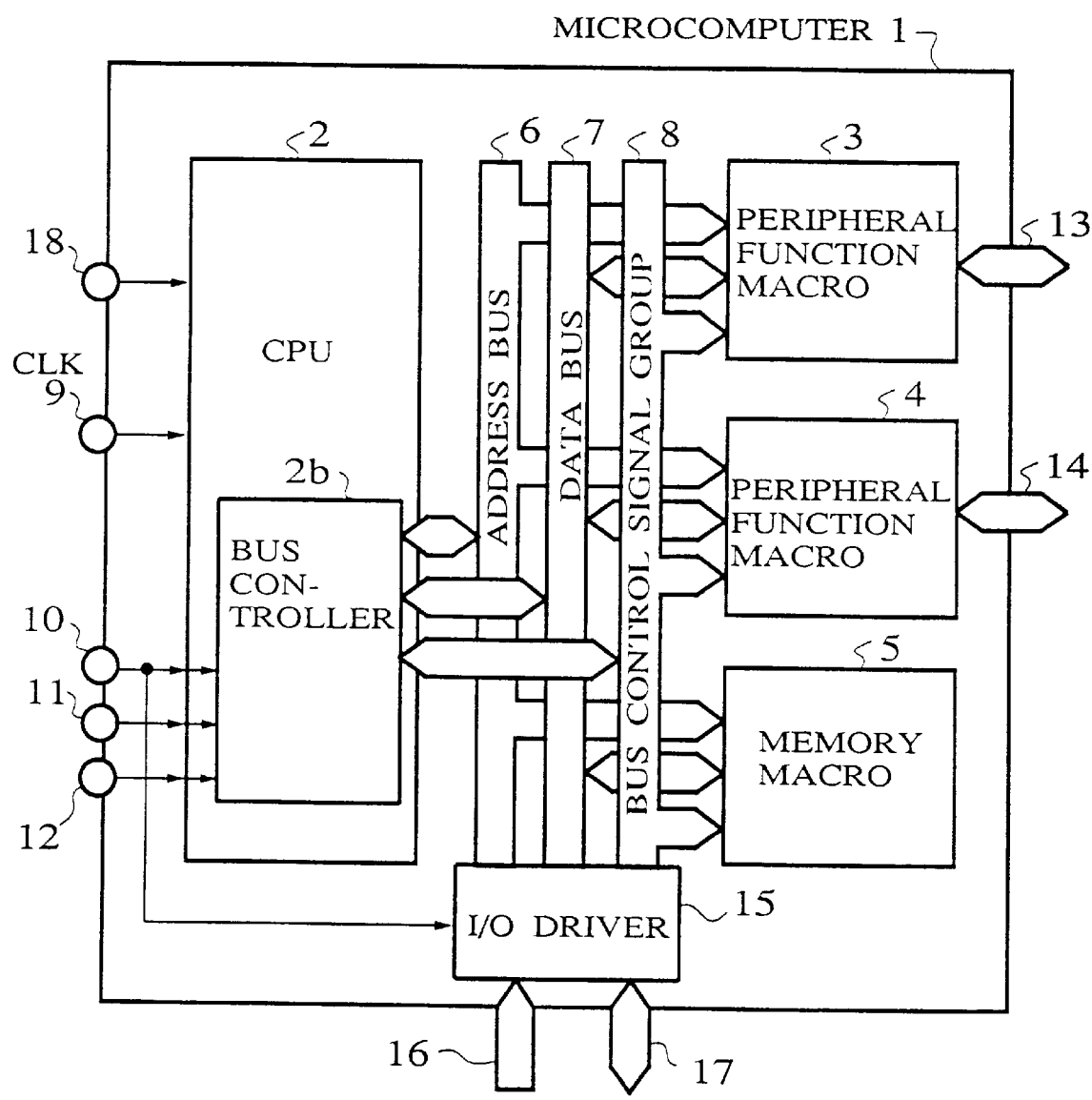
FIG. 2 is a block diagram showing a microcomputer according to the first embodiment of the present invention.

Various embodiments of the present invention will be described with reference to the accompanying drawings. FIG. 2 is a block diagram showing a microcomputer according to the first embodiment of the present invention.

The microcomputer 1 has a CPU 2, peripheral function macros 3 and 4, and a memory macro 5. These elements are connected to one another through an address bus 6, a data bus 7, and a bus control signal group 8. The function macros 3 and 4 may be serial I/O ports, parallel ports, or timers. The memory macro 5 may be a ROM for storing programs and constants, or a RAM for storing variables and downloaded programs. The function macros 3 and 4 and memory macro 5 are peripheral macros.

The bus control signal group 8 includes control signals such as a read signal RD and a write signal WR. The read signal RD is a strobe signal that is asserted in a read bus cycle to read data from the peripheral macros. The write signal WR is a strobe signal that is asserted in a write bus cycle to write data into the peripheral macros.

The microcomputer 1 also has a clock terminal 9 for receiving a clock signal and external terminals 10, 11, and 12 for receiving external signals. The external signal supplied to the terminal 10 specifies a test mode of the peripheral macros. The external signal supplied to the terminal 11 indicates a request from the outside of the CPU 2, to carry out a bus cycle on the peripheral macros. The external signal to the terminal 12 is HIGH to request a read cycle and LOW to request a write cycle. In response to the control signals to the terminals 10 to 12, only the bus controller 2b of the CPU 2 is activated to test the peripheral macros.

The CPU 2 operates in synchronization with a clock signal CLK supplied to the clock terminal 9. The CPU 2 receives the external signals supplied to the terminals 10 to 12, to test the peripheral macros. When the external signal to the terminal 10 changes to LOW, the CPU 2 disables an internal request for a bus cycle. When the external signal to the terminal 11 changes to LOW, the CPU 2 recognizes an external bus cycle request and executes a read bus cycle when the signal to the terminal 12 is HIGH, and a write bus cycle when the signal to the terminal 12 is LOW.

During the execution of the externally requested bus cycle, the CPU 2 provides the bus control signals such as RD and WR, similar to a bus cycle requested inside the CPU 2. However, the CPU 2 stops providing the address bus 6 with an address and the data bus 7 with data.

The function macros 3 and 4 have external terminals 13 and 14, respectively, serving as interfaces with respect to external devices. The address bus 6 and data bus 7 are connected to external terminal groups 16 and 17, respectively, through an I/O driver 15.

The I/O driver 15 is connected to the external terminal 10 and the signal RD of the bus control signal group 8. When the external signal to the terminal 10 is LOW, the I/O driver 15 connects the address bus 6 to the terminal group 16. When the external signal to the terminal 10 is LOW and the signal RD is LOW, the I/O driver 15 connects the data bus 7 to the terminal group 17. When the external signal to the terminal 10 is LOW and the signal RD is HIGH, the I/O driver 15 connects the terminal group 17 to the data bus 7.

The microcomputer 1 is initialized in response to a reset signal supplied to a reset terminal 18.

Figure 3:
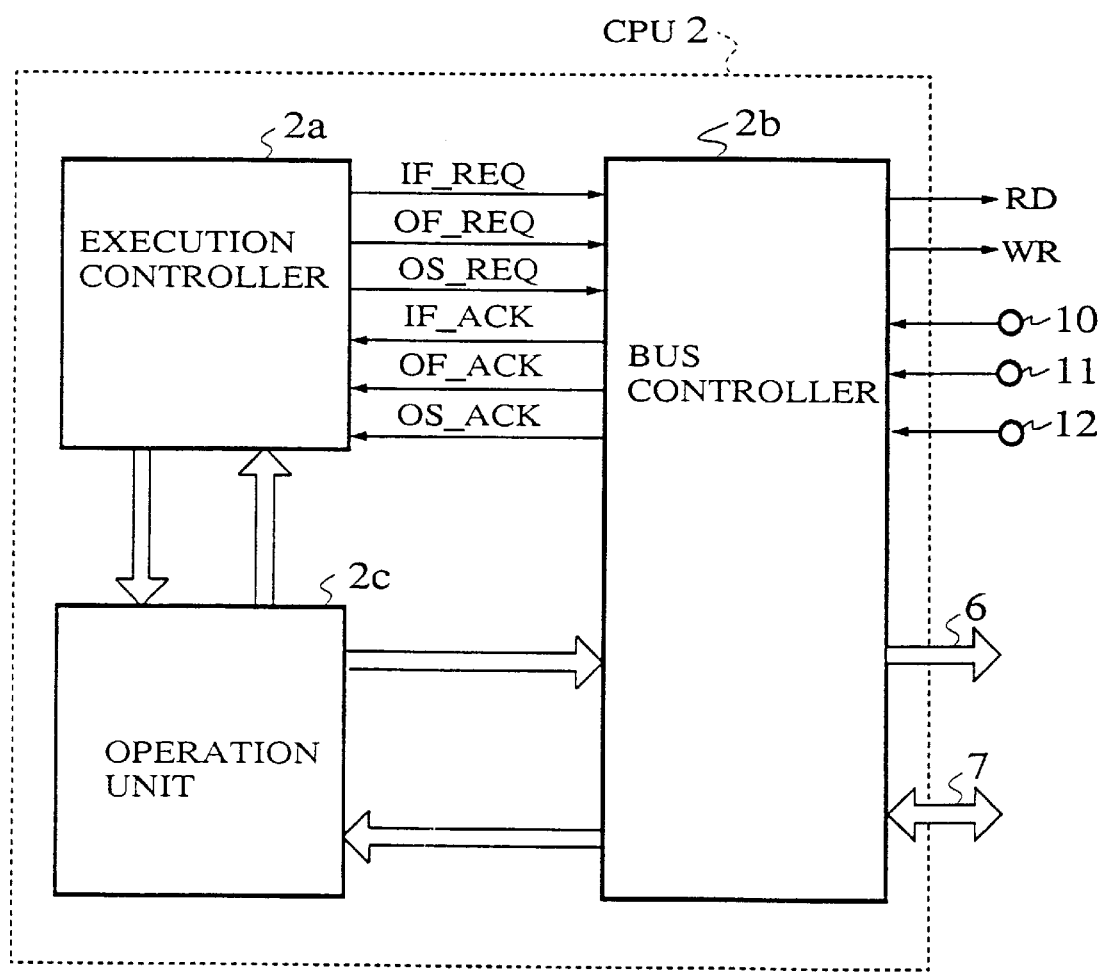
FIG. 3 is a block diagram showing a CPU 2 of the microcomputer of FIG. 2.

FIG. 3 is a block diagram showing the CPU 2 of FIG. 2.

The CPU 2 has an execution controller 2a for controlling the execution of instructions, a bus controller 2b connected to the function macros 3 and 4 and memory macro 5 through the address and data buses 6 and 7, for generating a bus control signal to inform the peripheral macros of the execution of a bus cycle, and an operation unit 2c connected to the execution controller 2a and bus controller 2b, for processing data.

To execute an instruction fetching bus cycle, an operand fetching bus cycle, or an operand storing bus cycle, the execution controller 2a activates a corresponding one of signals IF-REQ, OF-REQ, and OS-REQ, to request the bus controller 2b to carry out the bus cycle. Upon receiving the request, the bus controller 2b activates a corresponding one of signals IF-ACK, OF-ACK, and OS-ACK, and carries out the requested bus cycle.

For the instruction fetching bus cycle, the CPU 2 provides the address bus 6 with an instruction address and changes the signal RD to LOW, to fetch instruction codes from the memory macro 5 through the data bus 7.

For the operand fetching bus cycle, the CPU 2 provides the address bus 6 with an operand address and changes the signal RD to LOW, to fetch operand data from the function macros 3 and 4 or the memory macro 5 through the data bus 7.

For the operand storing bus cycle, the CPU 2 provides the address bus 6 with an operand address and the data bus 7 with operand data and changes the signal WR to LOW, to write the data on the data bus 7 into the function macros 3 and 4 or the memory macro 5.

Figure 1:
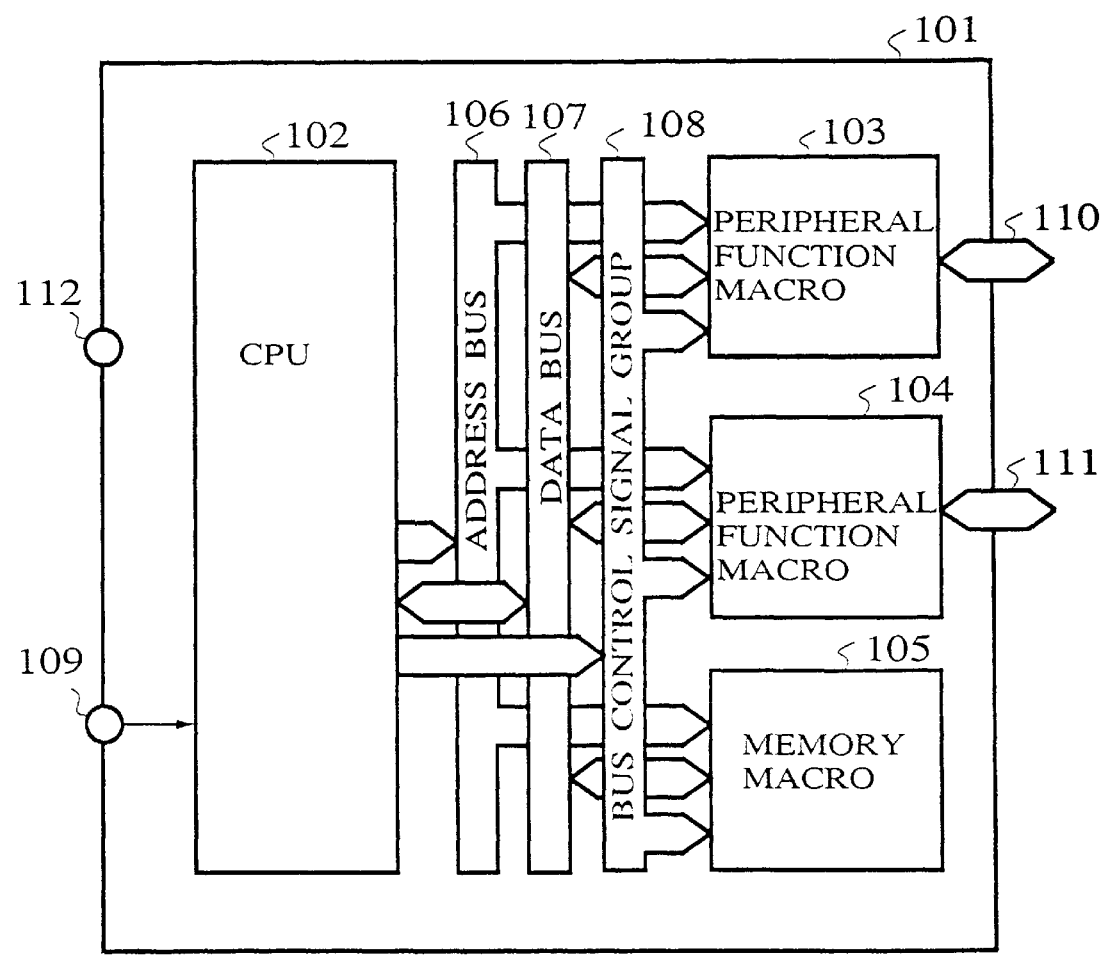
FIG. 1 is a block diagram showing a microcomputer according to a prior art.

The operation of the microcomputer 1 of FIGS. 1 and 2 and a method of testing the peripheral macros will be explained with reference to the timing chart of FIG. 4.

At time t1, the signal to the reset terminal 18 is LOW, and the microcomputer 1 is reset. At time t2, the reset terminal 18 is HIGH to release the reset state of the microcomputer 1. At this time, the terminal 10 is LOW to set the microcomputer 1 in a peripheral macro test mode and disable any bus cycle requested inside the CPU 2.

At time t21, the terminals 11 and 12 change to LOW. At time t3, the CPU 2 recognizes an external request for a write bus cycle. During a period T1, the signal WR is LOW to write data into the peripheral macros.

In this case, an address for the peripheral macros provided to the terminal group 16 is connected to the address bus 6, and write data provided to the terminal group 17 is connected to the data bus 7. At the same time, the CPU 2 stops providing an address to the address bus 6 and data to the data bus 7.

When the signal WR rises, the data on the data bus 7 is written into an internal register of the peripheral macros specified by the address on the address bus 6.

At time t31, the terminal 12 is kept at LOW, and the terminal 11 changes to LOW. At time t4, the CPU 2 recognizes a request for a write bus cycle. During a period T2, the signal WR is LOW to write data into the peripheral macros.

In this way, the write operation of the peripheral macros is tested.

At time t41, the terminal 12 is HIGH, and the terminal 11 changes to LOW. AT time t5, the CPU 2 recognizes an external request for a read bus cycle. During a period T3, the signal RD is LOW to read data out of the peripheral macros. At this time, an address for the peripheral macros applied to the terminal group 16 is connected to the address bus 6. The CPU 2 stops providing an address to the address bus 6.

When the signal RD falls, the contents of an internal register of the peripheral macro specified by the address on the address bus 6 are supplied to the data bus 7 and are sent outside through the terminal group 17.

At time t51, the terminal 12 is kept at HIGH, and the terminal 11 changes to LOW. At time t6, the CPU 2 recognizes an external request for a read bus cycle. During a period T4, the signal RD is LOW to read data out of a specified one of the peripheral macros.

In this way, the read operation of the peripheral macros is tested.

Figure 4:
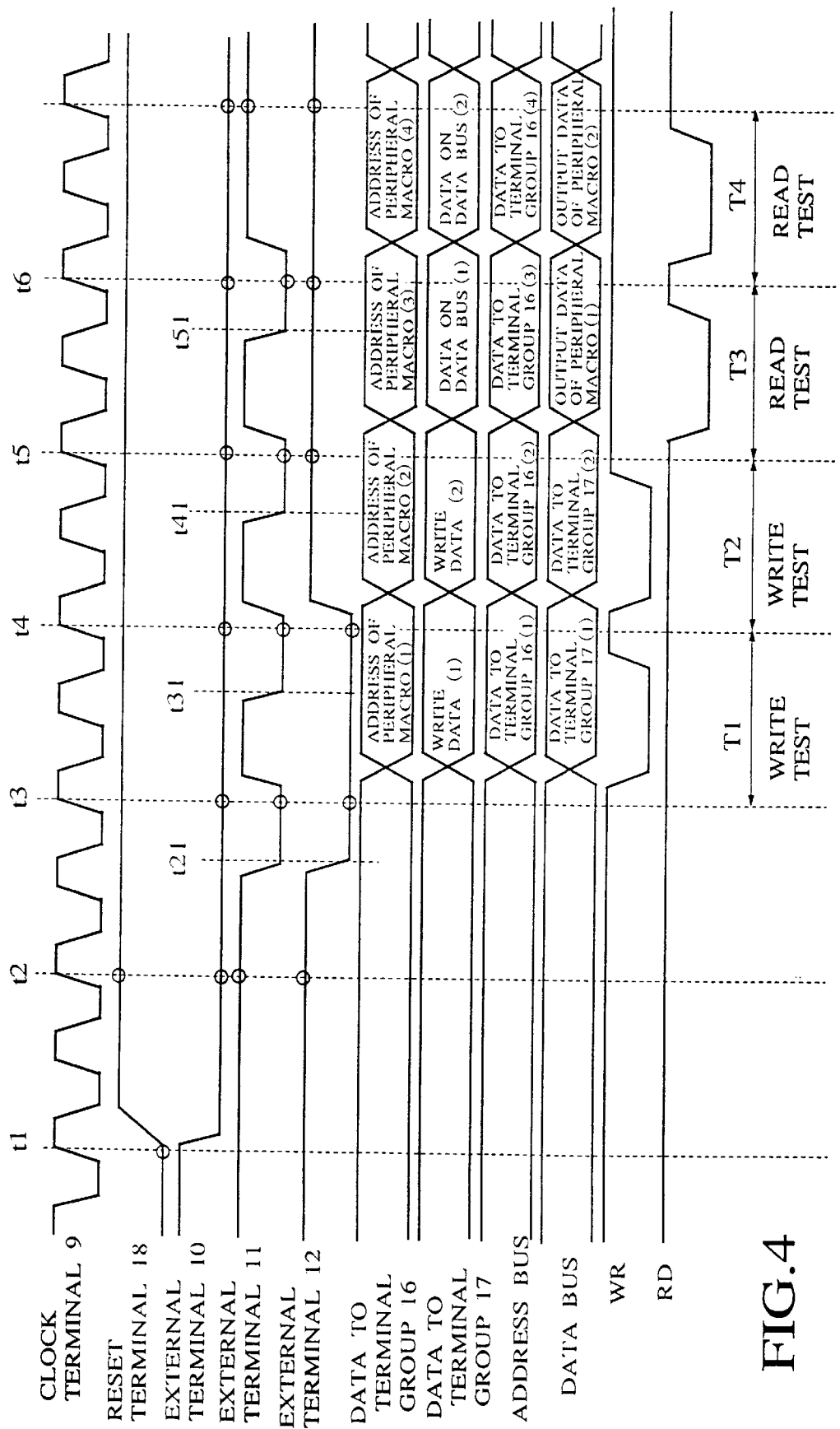
FIG. 4 is a timing chart showing the operation of the microcomputer of FIG. 2.

The microcomputer according to the first embodiment of FIGS. 2, 3, and 4 tests the peripheral macros only by using the bus controller 2b of the CPU 2 without the instruction execution function of the CPU 2. Namely, the first embodiment requires no test program having machine-language instructions proper for the CPU 2. The execution controller 2a and operation unit 2c of the CPU 2 are not needed for the test. Namely, an instruction fetching bus cycle for fetching a test program is not needed. This results in reducing test vectors, shortening a test time during manufacturing, and lowering test costs.

To test the peripheral macros, only the bus controller of the CPU is needed. Namely, only the bus controller of the CPU may be modeled when simulating a customized microcomputer. Compared with simulating a microcomputer with a full operation model of the CPU, the present invention is advantageous in shortening a simulation time and development period and improving the accuracy of the simulation. It is not necessary to provide a user with a full operation model of a CPU, and therefore, the internal structure of the CPU is concealed from the user.

Figure 5:
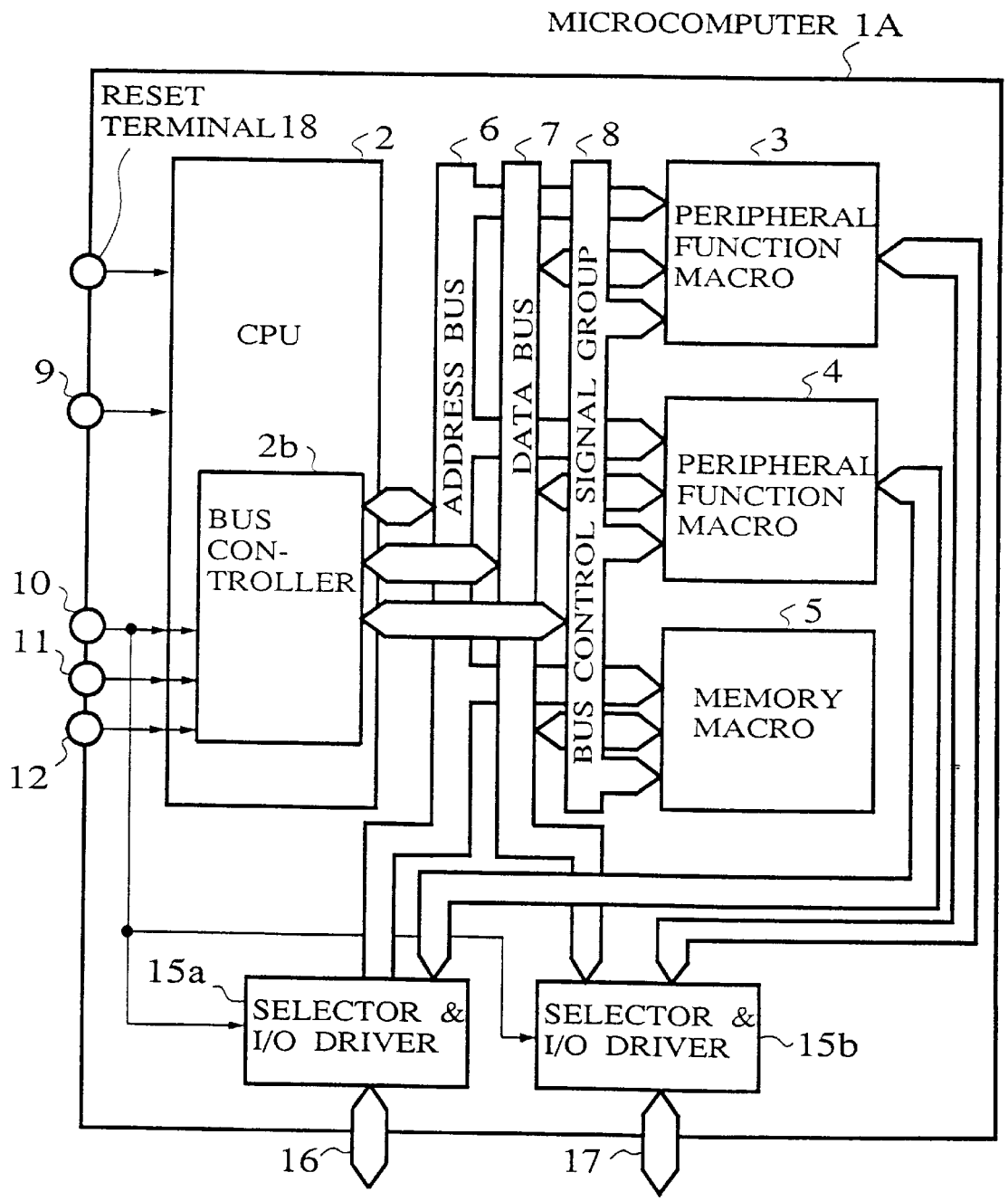
FIG. 5 is a block diagram showing a microcomputer according to the second embodiment of the present invention.

FIG. 5 is a block diagram showing a microcomputer according to the second embodiment of the present invention.

The second embodiment differs from the first embodiment in that it employs external terminal groups 16 and 17 serving as the external terminals 13 and 14 of the first embodiment.

Namely, the microcomputer 1A of the second embodiment is not provided with the separate external terminals 13 and 14 of the first embodiment. Instead of the I/O driver 15 of the first embodiment, the second embodiment employs selector I/O drivers 15a and 15b connected to the external terminal groups 16 and 17, respectively. An external signal supplied to an external terminal 10 is used as a select signal to let the selector I/O driver 15a connect the terminal group 16 to an address bus 6 or to a function macro 4, and let the selector I/O driver 15b connect the terminal group 17 to a data bus 7 or to a function macro 3. Like the first embodiment, the second embodiment employs only a bus controller 2b of a CPU 2 when testing the peripheral macros.

The second embodiment provides the same effect as the first embodiment without the external terminals 13 and 14.

Figure 6:
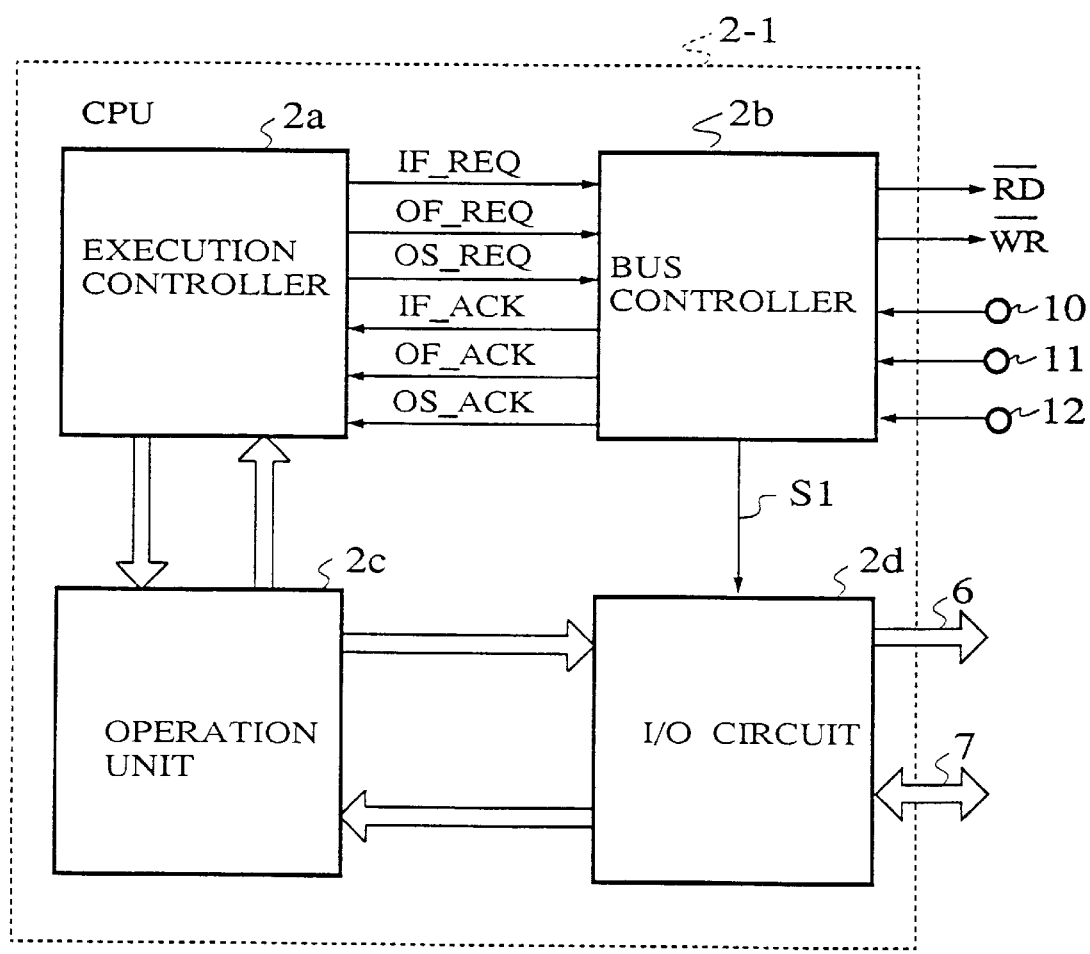
FIG. 6 shows a CPU 2-1 that is a modification of a CPU 2 of the microcomputer 1A of FIG. 5.

FIG. 6 shows a CPU 2-1, which is a modification of the CPU 2 of the second embodiment of FIG. 5.

The CPU 2-1 has an execution controller 2a, the bus controller 2b, an operation unit 2c, and an I/O circuit 2d controlled by an I/O control signal S1 provided by the bus controller 2b.

During the execution of a bus cycle according to a request from the execution controller 2a, the I/O circuit 2d electrically connects the operation unit 2c to the address and data buses 6 and 7. During a test mode of the peripheral macros started by an external request, the I/O circuit 2d electrically disconnects the operation unit 2c from the address and data buses 6 and 7.

Only by controlling the bus controller 2b, an address output from the CPU to the address bus 6 as well as a data output from the CPU to the data bus 7 are surely stopped during the test of the peripheral macros. During the test, only the bus controller 2b of the CPU works in response to external control signals passed through the external terminals 10, 11, and 12.

Figure 7:
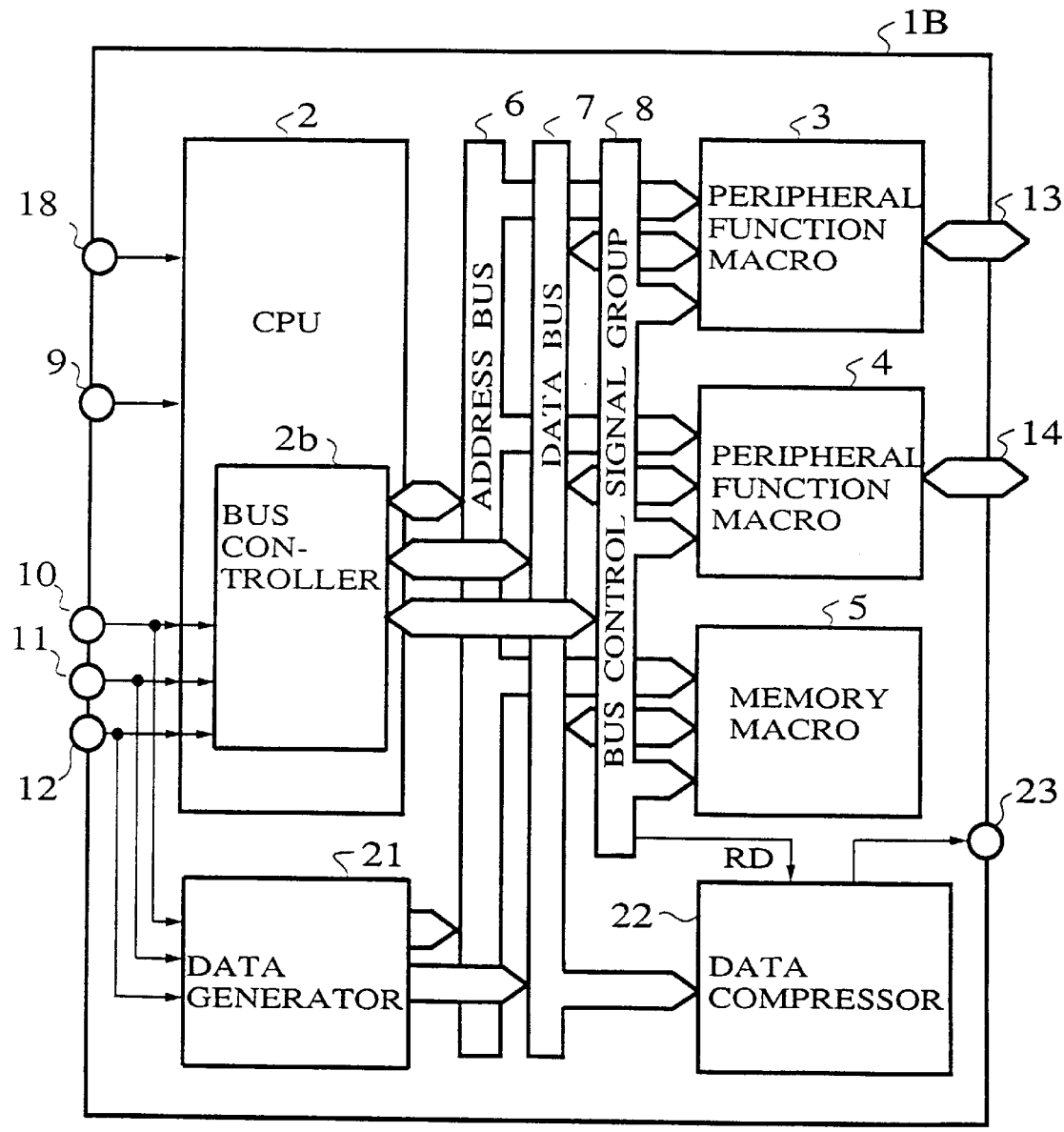
FIG. 7 is a block diagram showing a microcomputer 1B according to the third embodiment of the present invention.

FIG. 7 is a block diagram showing a microcomputer 1B according to the third embodiment of the present invention.

This microcomputer 1B requires no external addresses nor test data when testing peripheral macros. The microcomputer 1B is capable of testing the peripheral macros without providing read data outside.

The microcomputer 1B is not provided with the I/O driver 15 and external terminal groups 16 and 17 of the first embodiment of FIG. 2. The microcomputer 1B has a data generator 21 for generating test data for testing the peripheral macros, a data compressor 22 for compressing data read out of the peripheral macros and providing a test result, and an external terminal 23 for providing the test result from the data compressor 22 to the outside. During a test, only a bus controller 2b of a CPU 2 is used, similar to the first embodiment.

Figure 8:
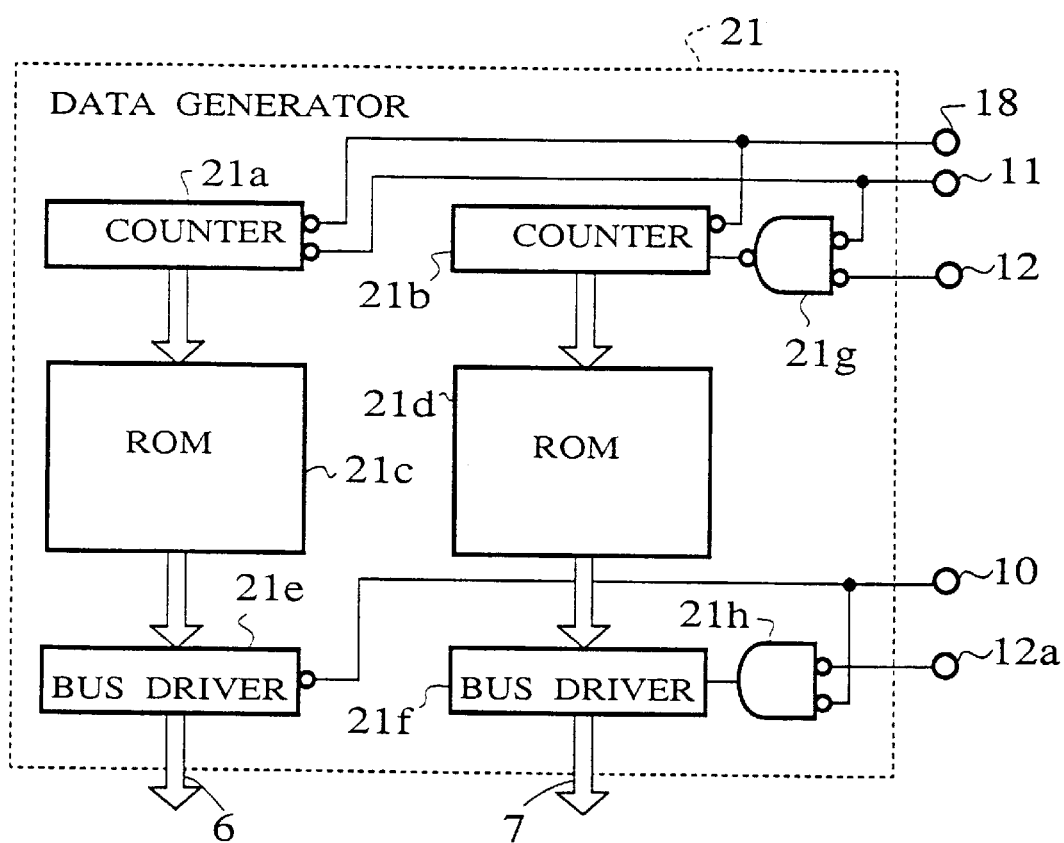
FIG. 8 shows a data generator 21 in the microcomputer 1B of FIG. 7.

FIG. 8 shows the data generator 21 of the microcomputer 1B.

The data generator 21 has a pair of counter registers 21a and 21b, a pair of ROMs 21c and 21d, a pair of bus drivers 21e and 21f, and a pair of logic gates 21g and 21h.

The counter 21a specifies an address of the ROM 21c. When a reset terminal 18 changes to LOW, the counter 21a is initialized to 0 and starts to count a rising edge of an external signal applied to an external terminal 11. The counter 21b specifies an address of the ROM 21d. When the reset terminal 18 changes to LOW, the counter 21b is initialized to 0. When an external terminal 12 is LOW, the counter 21b counts a rising edge of the external signal applied to the terminal 11.

The ROM 21c stores a write address and a read address and provides the bus driver 21e with an address specified by the counter 21a. The ROM 21d stores write data and provides the bus driver 21f with data at an address specified by the counter 21b. When an external terminal 10 is LOW, the bus driver 21e provides the address bus 6 with data provided by the ROM 21c. When the terminal 10 is LOW and a signal 12a latched by the terminal 12 in response to a clock signal is LOW, the bus driver 21f provides the data bus 7 with data provided by the ROM 21d.

Figure 9:
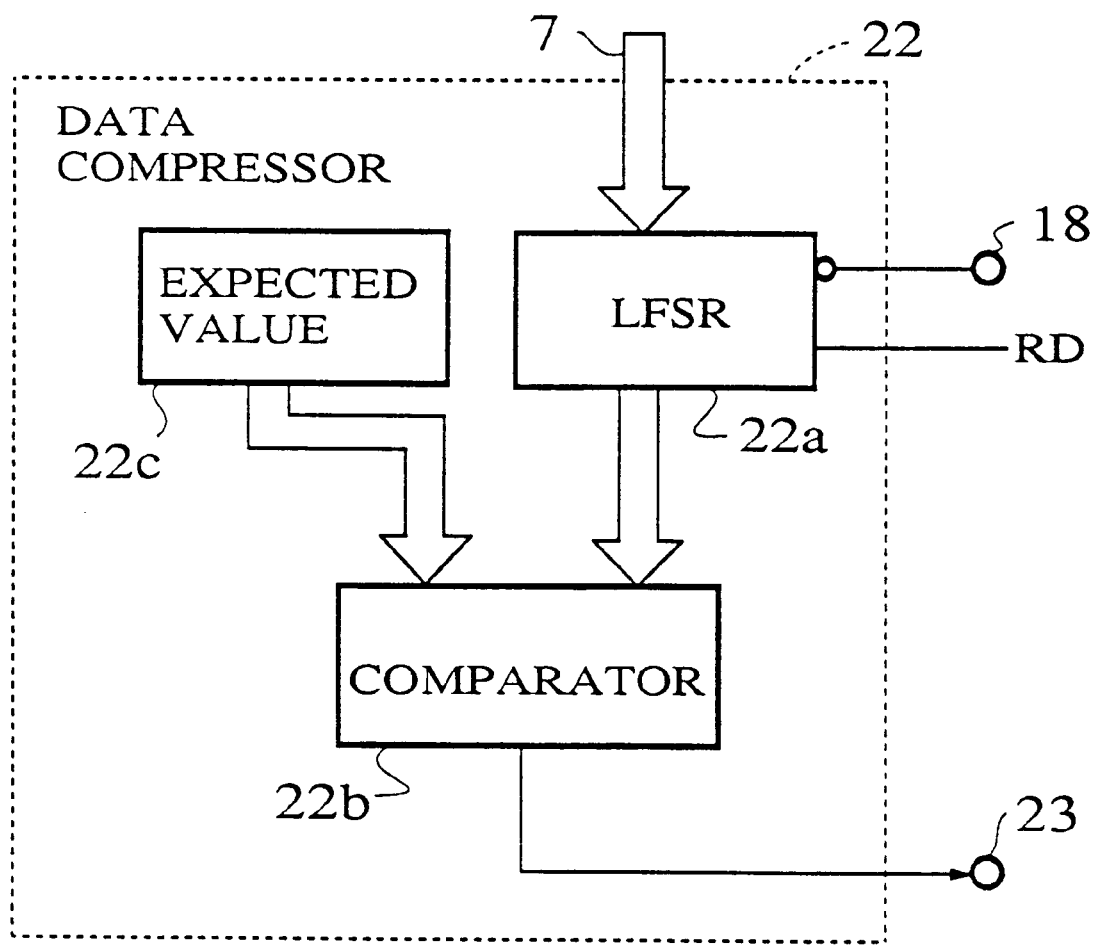
FIG. 9 shows a data compressor 22 in the microcomputer 1B of FIG. 7.

FIG. 9 shows the data compressor 22 of the microcomputer 1B of FIG. 7.

The data compressor 22 has a linear feedback shift register (LFSR) 22a and a comparator 22b. The LFSR 22a is initialized when the reset terminal 18 is LOW. At a rising edge of a read signal RD, the LFSR 22a compresses data on the data bus 7 and latched data in parallel and latches the compressed data. The comparator 22b compares the data of the LFSR 22a with an expected value 22c, which is set by compressing read data in parallel. If they agree with each other, the comparator 22b provides the external terminal 23 with a signal of LOW.

Figure 10:
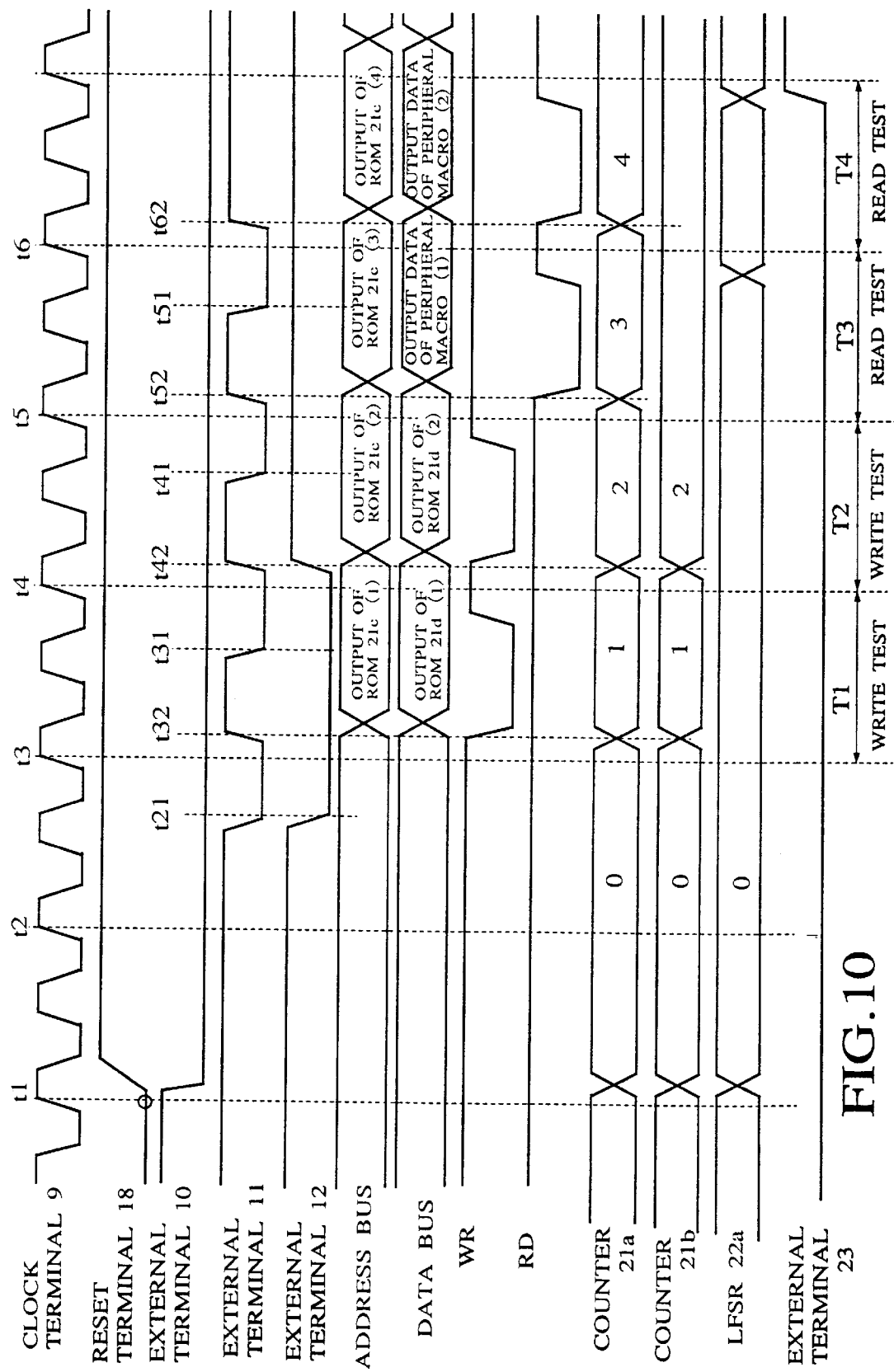
FIG. 10 is a timing chart showing the operation of the microcomputer 1B of FIG. 7.

FIG. 10 is a time chart showing the operation of the microcomputer 1B and a method of testing the peripheral macros thereof.

A clock signal to a clock terminal 9, a reset signal to the terminal 18, external signals to the terminals 10, 11, and 12, and signals WR and RD are the same as those of the microcomputer 1 of the first embodiment of FIG. 2.

At time t2, the microcomputer 1B is released from a reset state and is put in a peripheral macro test mode.

At time t21, the terminal 12 changes to LOW, and an external signal of LOW is applied to the terminal 11. At time t3, the CPU 2 recognizes an external request for a write bus cycle. In a period T1, the signal WR is LOW to write data into a peripheral macro.

At time t32, the signal to the terminal 11 rises, and the counters 21a and 21b of the data generator 21 are incremented. In the period T1, the ROM 21c provides the address bus 6 with an address, and the ROM 21d provides the data bus 7 with data. Accordingly, the CPU 2 provides no address to the address bus 6 and no data to the data bus 7.

When the signal WR rises, data on the data bus 7 is written into an internal register of the peripheral macro specified by the address on the address bus 6.

At time t31, the terminal 12 is kept at LOW, and the terminal 11 changes to LOW. At time t4, the CPU 2 recognizes an external request for a write bus cycle. In a period T2, the signal WR is LOW to write data into a peripheral macro. At time t42, the terminal 12 changes to HIGH to increment the counters 21a and 21b of the data generator 21. In the period T2, the ROM 21c provides the address bus 6 with an address, and the ROM 21d provides the data bus 7 with data. When the signal WR rises, the data on the data bus 7 is written into an internal register of the peripheral macro specified by the address on the address bus 6.

At time t41, the terminal 12 is HIGH, and the terminal 11 changes to LOW. At time t5, the CPU 2 recognizes an external request for a read bus cycle. In a period T3, the signal RD is LOW to read data out of a peripheral macro.

At time t52, the terminal 11 changes to HIGH to increment the counter 21a of the data generator 21. At this time, the counter 21b is unchanged. In the period T3, the ROM 21c provides the address bus 6 with an address, and therefore, the CPU 2 provides no address to the address bus 6.

When the signal RD falls, the contents of an internal register of the peripheral macro specified by the address on the address bus 6 are supplied to the data bus 7. When the signal RD rises, the data on the data bus 7 is compressed and latched by the LFSR 22a of the data compressor 22.

At time t51, the terminal 12 is HIGH, and the terminal 11 changes to LOW. At time t6, the CPU 2 recognizes an external request for a read bus cycle. In a period T4, the signal RD is LOW to read data out of a peripheral macro. At time t62, the terminal 11 changes to HIGH to increment the counter 21a of the data generator 21. In the period T4, the ROM 21c provides the address bus 6 with an address. When the signal RD falls, the contents of an internal register of the peripheral macro specified by the address on the address bus 6 are transferred to the data bus 7. When the signal RD rises, the data on the data bus 7 is compressed and latched by the LFSR 22a of the data compressor 22.

When the value latched by the LFSR 22a agrees with the expected value 22c, the terminal 23 changes to LOW.

In this way, the third embodiment stores in advance write and read addresses in the ROM 21c and write data in the ROM 21d according to a test sequence of the peripheral function blocks. Accordingly, it is not necessary to transfer addresses and data from the outside to the microcomputer 1. Since the comparator 22b of the data compressor 22 has the expected compressed values 22c, a test is carried out without providing read data outside.

In summary, a microcomputer according to the present invention employs a CPU having a bus controller and an execution controller. When the bus controller receives an external signal to execute a bus cycle, it executes the bus cycle while disabling a bus cycle request from the execution controller. Accordingly, peripheral circuits in the microcomputer are tested only with the bus controller of the CPU.

The present invention requires only a model of the bus controller of the CPU, to simulate the operation of a customized microcomputer that employs the CPU. This shortens a simulation time and development time of customized microcomputers and improves simulation accuracy.

It is not necessary to provide a user with a full operation model of the CPU, so that the internal structure of the CPU is concealed from the user.

The present invention employs an I/O circuit for electrically disconnecting the CPU from address and data buses when executing an externally requested bus cycle. Namely, only by controlling the bus controller of the CPU, an address output from the CPU to the address bus as well as a data output from the CPU to the data bus are surely disabled.

The bus controller of the CPU provides a bus control signal in response to an external control signal passed through a first external terminal, to write data supplied through a second external terminal into a peripheral circuit. Namely, the present invention is capable of carrying out a write test of the peripheral circuits without the instruction execution function of the CPU, a test program having machine-language instructions proper for the CPU, nor an instruction fetching bus cycle for fetching the test program. This results in minimizing test vectors and a test time during manufacturing and reducing test costs.

The bus controller of the CPU provides a bus control signal in response to an external control signal passed through the first external terminal, to read data out of the peripheral circuits and send the read data outside through the second external terminal. Namely, the present invention is capable of carrying out a read test of the peripheral circuits without the instruction execution function of the CPU.

A data generator of the microcomputer generates data and the bus controller of the CPU provides a bus control signal to write the generated data into the peripheral circuits, in response to an external control signal passed through the external terminal. Namely, the present invention is capable of carrying out a write test of the peripheral circuits without externally supplying write data and without increasing the number of external terminals. This reduces test costs during manufacturing.

The bus controller of the CPU provides a bus control signal to read data out of the peripheral circuits and a data compressor of the microcomputer compresses the read data, in response to an external control signal passed through the external terminal. Namely, the present invention is capable of carrying out a read test of the peripheral circuits without providing read data outside.

It should be apparent to those skilled in the art that many changes can be made in the details and arrangements of the steps and parts of the present invention without departing from the scope of the invention as defined in the appended claims.

What is claimed is:

1. A central processing unit comprising:

an execution controller controlling execution of instructions and requesting an execution bus cycle;

a bus controller connected to external circuits through an address bus and a data bus, said bus controller generating a bus control signal to inform the external circuits of a requested execution bus cycle the requested execution bus cycle being one of an instruction fetching bus cycle for fetching an instruction from the external circuits, an operand fetching bus cycle for fetching an operand from the external circuits, and an operand storing bus cycle for writing a result of an operation into the external circuits;

an operation unit connected to said execution controller and said bus controller, said operation unit processing data in accordance with the requested execution bus cycle;

a test control circuit supplying said bus controller with a test control signal, said address bus with test addresses, and said data bus with test data; and wherein said bus controller responds to said test control signal to disable any requested execution bus cycle from said execution controller and enables a test bus cycle using said test addresses and said test data.

2. The CPU according to claim 1, further comprising an I/O circuit connected to said bus controller and said execution controller, the I/O circuit electrically disconnecting said execution controller from the address and data buses while the test bus cycle requested by the test control circuit is being executed.

3. The central processing unit as claimed in claim 2, wherein the central processing unit is part of a microprocessor, and the microprocessor further comprises:

a peripheral circuit connected to said central processing unit through said data bus as at least one of said external circuits;

a first terminal which is part of said test control circuit, said first terminal receiving an external control signal that specifies a test mode of said peripheral circuit;

a second terminal which is part of said test control circuit, said second terminal being connected to the data bus; and wherein the bus controller provides a bus control signal in response to the external control signal passed through said first terminal to write data supplied through said second terminal into said peripheral circuit as said test data.

4. The central processing unit as claimed in claim 2, wherein the central processing unit is part of a microprocessor, and the microprocessor further comprises:

a peripheral circuit connected to said central processing unit through said data bus as at least one of said external circuits;

a first terminal which is part of said test control circuit, said first terminal receiving an external control signal that specifies a test mode of said peripheral circuit;

a second terminal which is part of said test control circuit, said second terminal being connected to the data bus; and wherein the bus controller provides a bus control signal in response to the external control signal passed through said first terminal to read data out of said peripheral circuit as said test data, and to send the read test data outside through said second external terminal.

5. The central processing unit as claimed in claim 2, wherein the central processing unit is part of a microprocessor, and the microprocessor further comprises:

a peripheral circuit connected to said central processing unit through said data bus as at least one of said external circuits;

a first terminal which is part of said test control circuit, said first terminal receiving an external control signal that specifies a test mode of said peripheral circuit;

a second terminal which is part of said test control circuit, said second terminal receiving an external control signal indicating whether the test mode is a write test mode or a read test mode;

a third terminal which is part of said test control circuit, said third terminal being connected to the data bus; and wherein the bus controller provides a bus control signal in response to the external control signal passed through said first external terminal to write data supplied through said third external terminal and said data bus into said peripheral circuit as said test data, when the external control signal passed through said second external terminal indicates the write test mode, and wherein the bus controller provides a bus control signal in response to the external control signal passed through said first external terminal to read data out of said peripheral circuit as said test data and to send the read test data outside through said third external terminal when the external control signal passed through said second external terminal indicates the read test mode.

6. The central processing unit as claimed in claim 2, wherein the central processing unit is part of a microprocessor, and the microprocessor further comprises:

a peripheral circuit connected to said central processing unit through said data bus as at least one of said external circuits;

a terminal which is part of said test control circuit, said terminal receiving an external control signal that specifies a test mode of said peripheral circuit;

a data generator which is part of said test control circuit, said data generator generating data as said test data used to test said peripheral circuit; and wherein said data generator generating said test data and the bus controller provide a bus control signal to write the generated test data into said peripheral circuit in response to the external control signal passed through said terminal.

7. The central processing unit as claimed in claim 2, wherein the central processing unit is part of a microprocessor, and the microprocessor further comprises:

a peripheral circuit connected to said central processing unit through said data bus as at least one of said external circuits;

a terminal which is part of said test control circuit, said terminal receiving an external control signal that specifies a test mode of said peripheral circuit;

a data compressor compressing data on the data bus; and wherein the bus controller provides a bus control signal to read data out of said peripheral circuit as said test data and said data compressor compresses the read test data in response to the external control signal passed through said external terminal.

8. The central processing unit as claimed in claim 2, wherein the central processing unit is part of a microprocessor, and the microprocessor further comprises:

a peripheral circuit connected to said central processing unit through said data bus as at least one of said external circuits;

a first terminal which is part of said test control circuit, said first terminal receiving an external signal that specifies a test mode of said peripheral circuit;

a second terminal which is part of said test control circuit, said second terminal receiving an external signal indicating whether the test mode is a write test mode or a read test mode;

a data generator which is part of said test control circuit, said data generator generating data as said test data used to test said peripheral circuit;

a data compressor compressing data on the data bus; and wherein said data generator provides data to the data bus as said test data, and the bus controller provides a bus control signal to write the test data on the data bus into said peripheral circuit in response to the external control signal passed through said first terminal when the external control signal passed through said second terminal indicates the write test mode, and wherein the bus controller of said CPU provides a bus control signal to read out data of said peripheral circuit as said test data, and said data compressor compresses the read test data in response to the external control signal passed through said first terminal when the external control signal passed through said second terminal indicates the read test mode.

9. A microprocessor comprising:

a central processing unit;

a peripheral circuit;

an address bus and a data bus connected to said central processing unit and said peripheral circuit for exchanging data between said central processing unit and said peripheral circuit;

an I/O driver connected to said address bus and said data bus for exchanging data and addresses between said microprocessor and an external apparatus;

a bus controller connected to said address bus and said data bus for performing a bus cycle, said bus controller being operated selectively in a test mode in which no data and no address inside of said central processing unit is output to said address bus and said data bus;

a bus request terminal connected to said bus controller and externally available for receiving bus cycle request signal and initiating a bus cycle for exchanging data between said peripheral circuit and said external apparatus in said test mode of said bus controller; and a read/write terminal connected to said but controller for indicating whether data is output or input to said peripheral circuit.

10. The microprocessor as claimed in claim 9 wherein said bus controller is provided inside of said central processing unit.

11. The microprocessor as claimed in claim 9 further comprising a test mode setting terminal connected to said bus controller and externally available for setting said bust controller in said test mode.

12. The microprocessor as claimed in claim 9 wherein said peripheral circuit is a memory.

* * * * *

UNITED STATES PATENT AND TRADEMARK OFFICE
CERTIFICATE OF CORRECTION

PATENT NO. : 6,058,468
DATED : May 2, 2000
INVENTOR(S) : Masami FUNYU

It is certified that error appears in the above-identified patent and that said Letters Patent is hereby corrected as shown below:

On the Title Page Item [63], and the first paragraph in Column 1, has been omitted. Item [63] should read as follows:

Related U.S. Application Data

[63] Continuation of application Serial No. 08/523, 621, filed on 09/05/95, now abandoned.

-- ALSO --

The first paragraph in Column 1 should read as follows:

--This application is a Continuation of application Serial No. 08/523,621, filed on 09/05/95.--

Signed and Sealed this

Tenth Day of April, 2001

*Attest:*

NICHOLAS P. GODICI

*Attesting Officer*     Acting Director of the United States Patent and Trademark Office